United States Patent [19]
Sobotta

[11] 3,790,269
[45] Feb. 5, 1974

[54] SLIDE PROJECTOR FOR RING MAGAZINES

[75] Inventor: Reinhard Sobotta, Mascherode, Germany

[73] Assignee: Roller-Werke Franke & Heidecki, Brannschweig, Germany

[22] Filed: Sept. 14, 1971

[21] Appl. No.: 180,400

[52] U.S. Cl. ............................................... 353/117
[51] Int. Cl. ............................................. G03b 23/06
[58] Field of Search ........................... 353/103–117; 40/78.07, 78.06, 79

[56] References Cited
UNITED STATES PATENTS

| | | | |
|---|---|---|---|
| 3,606,545 | 9/1971 | Heinzmann | 353/117 |
| 926,939 | 5/1909 | Guerrart | 353/117 |
| 2,427,164 | 9/1947 | Stechbart | 353/116 |
| 2,146,452 | 2/1939 | Spindler | 353/117 |
| 3,502,405 | 3/1970 | Badalich | 353/116 |
| 3,584,946 | 6/1971 | Rube | 353/117 |
| 3,469,910 | 9/1969 | Badalich | 353/117 |
| 3,419,981 | 1/1966 | Zillmer | 40/79 |

Primary Examiner—Louis R. Prince
Assistant Examiner—A. J. Mirabito
Attorney, Agent, or Firm—Charles Shepard

[57] ABSTRACT

A slide projector for use with ring-shaped magazines arranged horizontally for rotation about a vertical axis offset laterally from the horizontal optical axis. As the magazine rotates step by step, an inclined ramp raises the slide which is to be projected so that its bottom edge will clear the rather low marginal wall of the ring-like magazine. A pusher member which extends beneath the bottom of the magazine, then up through the central stationary hub around which the magazine rotates, then radially toward the projection window, engages the edge of the slide, and pushes it radially into the projection window or gate on the optical axis, through a guide member which is beveled horizontally to receive the advancing edge of the slide and align it properly, and which is pivotally mounted and beveled vertically so as to be thrust aside by vertical axial movements of the magazine when the magazine is inserted in or removed from the projector.

4 Claims, 4 Drawing Figures

PATENTED FEB 5 1974
3,790,269
SHEET 1 OF 2

SLIDE PROJECTOR FOR RING MAGAZINES

BACKGROUND OF THE INVENTION

This invention relates to slide projectors of the kind which use ring-like or annular magazines for holding a number of slides to be successively projected, and in which the magazine is arranged horizontally for rotation about a vertical axis to bring successive slides in the magazine into a position opposite the picture gate or projection window on the optical axis. An inclined ramp lifts slides as they approach the projection window, so that by the time a particular slide reaches a location aligned laterally with the projection window (i.e., in the projection plane), the slide has been raised far enough so that its lower edge will clear the low outer wall or rim of the ring magazine. Thus the particular slide which is then to be projected can be transported laterally with respect to the horizontal optical axis, or radially with respect to the ring magazine, from the magazine itself into the proper picture projection position at the optical axis.

Such a lift ramp on the projector permits the use of a magazine in which the slides are held in their annularly arranged compartments and restrained at their two lateral edges between an outer wall or rim and an innr wall or rim of the magazine, so that they cannot accidentally drop out while the magazine is being handled, unless the magazine is turned upside down. In the case of drum magazines or ring-like magazines it has been usual, until now, to arrange the magazine with a slot at the picture-change position, through which slot the picture slide could drop downward. In the course of this motion, the slide was caught by a gripper and was introduced laterally into the picture gate. After projection, the slide had to be moved back to a position beneath the magazine, and then had to be shifted upward into the magazine, whereupon, if the magazine was turned through the next step, the next picture slide in the next compartment arrived at the position above the drop slot. This arrangement requires a rather great total height of the projector. A certain simplification results if the magazine is arranged above the projection gate so that the slide to be projected can drop down through the slot immediately into the projection position in the gate, without requiring also a lateral movement, and then can be lifted straight upwardly from projection position into the magazine again, when projection of this slide is completed. However, even with this simplification, a rather great height of the projector is required.

By means of a lift ramp in the guide track of the magazine, a slide arriving opposite the picture gate as a result of the motion of the magazine can be lifted sufficiently far upwardly out of the magazine so that it can then be shifted laterally into the picture gate or projection window at the optical axis. This can readily be done with straight-line magazines or "bar" magazines, since the magazine is inserted in or removed from its guide track on the projector by a straight horizontal or axial movement, and therefore it does not matter if a guiding member for guiding the lateral shifting movement of the slide happens to overlie or overlap the edge of the bar magazine. But if the principle is applied to a projector using horizontally arranged ring magazines (also called annular magazines or drum magazines) several difficulties or disadvantages result, and it is an object of the present invention to overcome such difficulties or disadvantages.

Whereas in the case of a bar magazine or straight-line magazine, it is sufficient to stop the slide gripper in the transport position of the magazine or in the magazine or in the magazine change position in such a manner that it makes the passage of the slides and of the magazine in the axial direction possible, this meets with difficulties of operation in the case of drum or ring magazine projectors. The slide guide at the picture gate or projection window has to be brought immediately (i.e. closely) to the side edge of the magazine if a safe and reliable change of the slide is desired. In doing this, the picture slide guide necessarily overlaps the adjacent edge of the magazine. In the case of a bar magazine, this is not a disadvantage; in fact, it is even an advantage, because thereby the exact guidance of the magazine can be obtained, which prevents tilting of the magazine, especially in the case of rather long magazines of the bar or straight-line type. Such a slide guide at the picture gate is necessary for the sake of accurate guidance of the picture slide in its transfer or shifting movement from the magazine into the picture window at the optical axis, and is desirable also for the sake of preventing tilting of the magazine, especially in the case of long bar magazines.

However, the use of such a construction is difficult in the case of a ring magazine as distinguished from a bar magazine, as already partially indicated above. First, care has to be taken that the slide gripper can be brought into a position in which the axial lifting out or insertion of the magazine is not impeded. Moreover, it is required that the slide guide at the picture window is formed in such a way that it also does not prevent the insertion or removal of the magazine, which is inserted or removed by motion in the direction of the axis on which it rotates. Thus when speaking of a ring type or drum type magazine which is arranged horizontally, axial motion is understood to mean vertical upward or downward motion in the direction of the vertical axis on which the magazine rotates step by step when feeding successive picture slides to the projection position. But when speaking of bar type or straight-line type magazines, axial motion is understood to mean motion in the direction of the longitudinal axis of the magazine, which is parallel to and offset laterally from the optical axis or projection axis. It is seen that if a slide gripper or a slide guide structure overlapped part of a bar magazine, it would not prevent the axial movements of the magazine which are necessary when inserting a magazine into the projector or removing it therefrom. But if either a slide gripper or a portion of a slide guide were to overlap part of a ring magazine as distinguished from a bar magazine, then it is seen that this would impede the necessary axial (i.e. vertical movement which the magazine must perform when removing a magazine from the projector or inserting a magazine into the projector.

These difficulties and disadvantages are avoided by a construction according to the present invention. According to the invention, the horizontally acting slide gripper structure extends radially beneath the magazine guide track, then comes up through the central aperture in the annular magazine to approximately the elevation of the top of the magazine (preferably extending up through a stationary central hub on which the ring magazine rotates) and thence extends horizontally laterally toward the optical axis, at an elevation appropriate to engage the lateral edge of the slide which is to be shifted into the projection window at the optical axis, to cause such shifting of the slide. Moreover, the slide guide at the picture gate or projection window has jaws which are hinged and are spring biased so that they normally overlie the adjacent side wall of the ring magazine, to come normally very close to the adjacent lateral edge of the slide which is to be projected, but because of the hinged construction the guide jaws can be swung aside, laterally toward the optical axis and away from the edge of the magazine, so as not to interfere with the axial removal and replacement motions of the magazine. In addition, the guide jaws have vertical bevels or cam surfaces which are engaged by the magazine during the axial movement of the magazine, to push the guide jaws aside automatically when a magazine is lifted axially out of the projector or when a new magazine is inserted axially into the projector. Moreover, the slide guide jaws carry a portion which engages with the resilient inner gripper jaw so that the latter is automatically removed from the magazine area by the automatic movement of the guide jaws when the magazine is axially removed or replaced. The guidance of the magazine against lateral displacement is preferably provided by a compact stationary cylinder in the central aperture of the magazine, which cylinder is provided with slots for the passage and the guidance of the gripper.

DESCRIPTION OF THE PREFERRED EMBODIMENT

Figure 1:
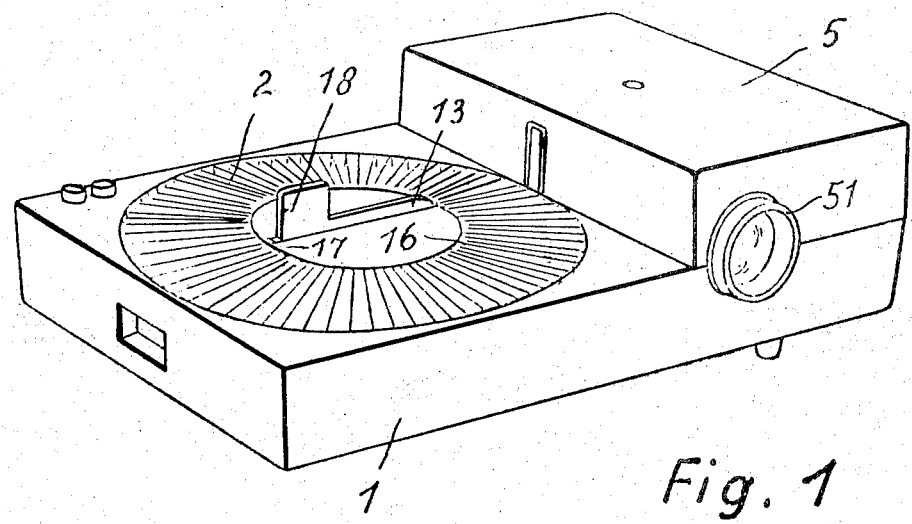
FIG. 1 is a perspective view of a projector according to a preferred embodiment of the invention, with the ring magazine in place thereon.

The magazine 2 of ring form or annular form (also sometimes called a drum magazine) lies flat horizontally in an annular recess in the low flat housing or casing portion 1 of the projector. The dimensions of this housing portion 1 of the projector have to exceed the diameter and the height of the magazine only by insignificant amounts, so that this housing portion 1 can be relatively small. The height of the magazine can be and preferably is less than the height of the picture slides contained therein, so that when the slides are in the usual radially arranged slots of the magazine, the upper parts of the slides project upwardly above the top surface of the magazine itself. Thus the top surface of the magazine may lie at approximately the same elevation as the optical axis (projection axis) which extends horizontally through the conventional lens in the conventional lens tube 51, in the somewhat higher portion 5 of the projector housing or casing.

In the guidance track of the magazine (that is, in the bottom of the annular recess in which the magazine rests) there is an inclined lift ramp 3 in a position opposite (that is, in lateral alignment with) the picture projection gate or window. As the ring magazine turns step by step to bring successive slides to a position opposite the projection window, the lift ramp engages the bottom edges of the slides approaching the projection window and lifts the slides so that by the time a particular slide has reached the position aligned with the projection window, this slide is raised to the position shown in broken lines in the FIG. 2, where the bottom edge of the slide is just above the top edge of the low marginal rim or flange 4 around the outer periphery of the magazine. When the picture slide is in this elevated position, it can be shifted laterally into the projection gate or window in the higher portion 5 of the projector housing and similarly shifted laterally back at this same elevation into the magazine again when projection of this particular slide is completed. When the slide is not in the vicinity of the projection window, it is not lifted upwardly by the ramp 3 and it rests on the partial bottom of the ring magazine, held against radially outward movement from the magazine by the low outer rim wall 4 and held against radially inward movement by the higher inner wall of the magazine. The inner wall and outer wall of the magazine are connected to each other and held rigidly with respect to each other by the radial partitions which subdivide the magazine area into individual compartments for individual slides, in the familiar manner.

The projector casing part 5, which contains the lens and the picture gate or projector window (of conventional construction) is necessarily higher than the casing portion 1 which contains the ring magazine, but is higher only by a relatively small amount, so that a very compact construction is provided. As already mentioned, the dimensions of the part containing the magazine are determined for all practical purposes by the dimensions of the magazine. The height of the part 5 has to be higher than the part 1 only by a sufficient amount to accommodate the height of a slide after the slide has been lifted by the ramp 3 sufficiently far to clear the low outer edge 4 of the magazine. The width of the casing part 5 is determined by the space needed to contain the driving mechanism and other parts necessary in the projector, in so far as these parts are not arranged in the casing portion 1 around the magazine.

Figure 2:
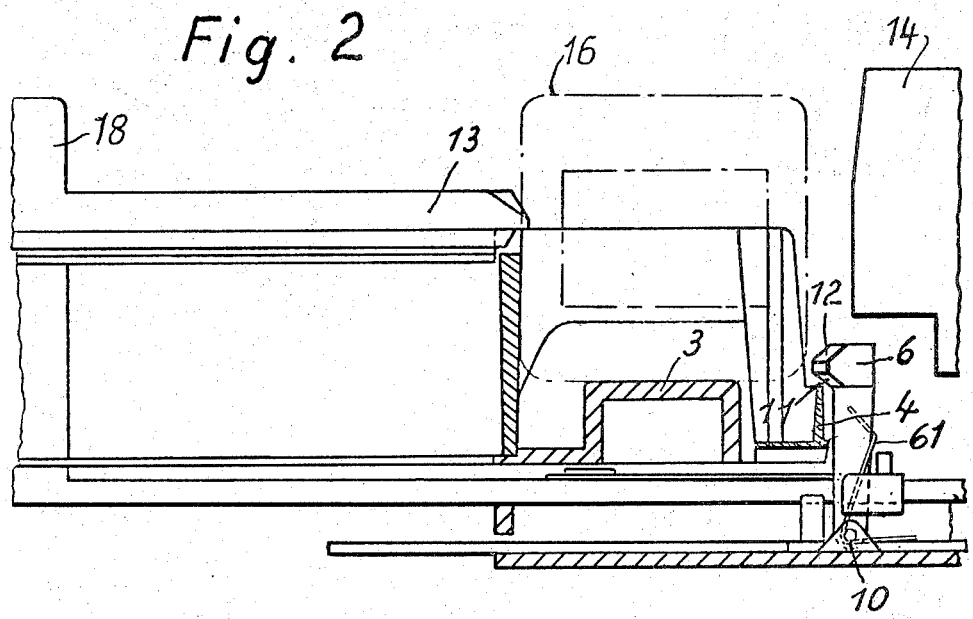
FIG. 2 is a fragmentary vertical section in the plane of the picture projection window or gate of the projector, and radially through a portion of the magazine.

At the edge of the magazine and in lateral alignment with the projection window there are guiding jaws 6 and 7 (FIG. 4) with horizontally beveled edges 8 and 9 acting as cams to insure that the advancing edge of the picture slide, when being shifted from the magazine toward the projection window, will properly enter the guidance channel 81 leading to the projection window. For safe operation and to prevent possible jamming, the guiding jaws 6 and 7 must be brought as close as possible to the outer edge of the slide, and therefore, in the normal position, these guiding jaws 6 and 7 overlie or overlap the peripheral retaining edge or wall 4 of the magazine, as seen in FIG. 2. In order that these guiding jaws 6 and 7 do not impede the axial vertical movements of the magazine when the magazine is being lifted out of the projector or inserted in the projector, the jaws 6 and 7 are not stationary but are swingable on the pivot pin 10 (FIG. 2) and are pressed by a conventional spring 61 laterally toward the center of the magazine, to the limit position illustrated in FIG. 2 where they overlie the edge 4 of the magazine.

In addition to being horizontally beveled at 8 and 9 to guide the picture slide into the projection channel, these jaws 6 and 7 are also vertically beveled at 11 and 12, at bottom and top, respectively, as shown in FIG. 2. If the magazine is drawn upwardly to remove it from the projector, the upper edge of the outer wall 4 of the magazine will engage the lower bevel 11 of the jaws and swing these jaws outwardly away from the center of the magazine, on the pivot pin, against the spring pressure. Similarly, when a magazine is being inserted into the projector, the descending edge of the magazine will engage the upper bevel 12 of the jaws and swing them out so that they do not interfere with placing the magazine in the projector. When the magazine becomes seated in its proper position, the spring pressure will cause the jaws to snap inwardly toward the center of the magazine, to the normal position overlying the top edge of the rim 4.

Figure 4:
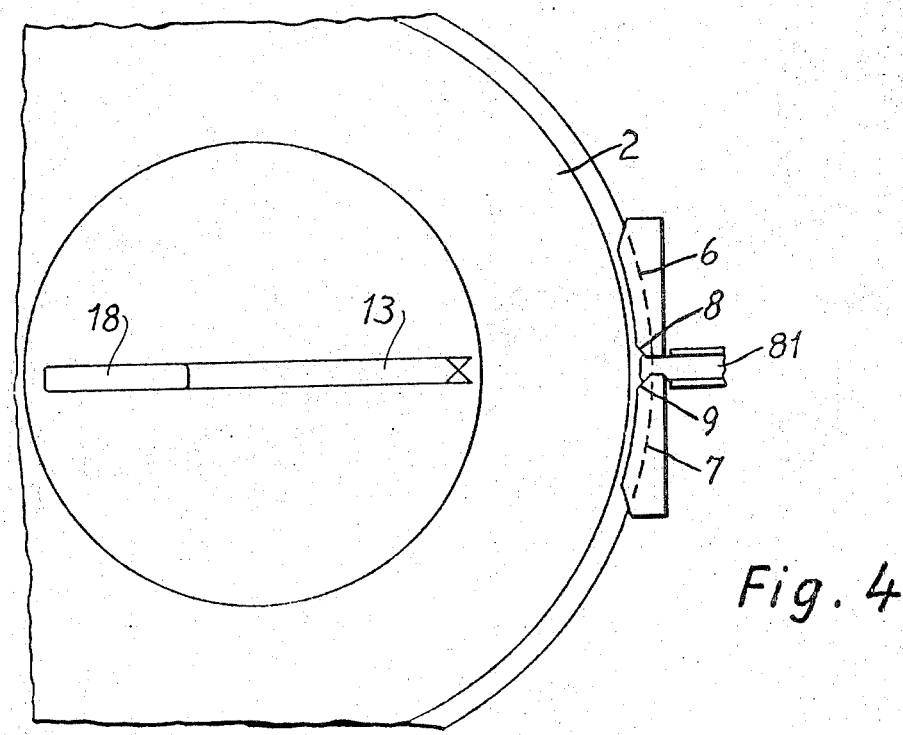
FIG. 4 is a top plan view of a portion of the magazine and associated parts of the slide guide and the gripper mechanism.

It will be noted from FIG. 4 that these jaws 6 and 7 extend for some distance circumferentially of the magazine, in each direction from the projection plane. This is to prevent accidental displacement, if the projector is tipped, of those slides which have been raised by the ramp 3 as they approach the projection plane. In other locations, some distance from the projection plane, the slides are not affected by the ramp 3 and are lower down in the magazine, held against lateral displacement by the edge 4, and so would not fall out if the projector is somewhat tilted. But where the slides have been raised by the ramp 3, the circumferentially extended jaws 6 and 7 serve to maintain the slides in place.

Figure 3:
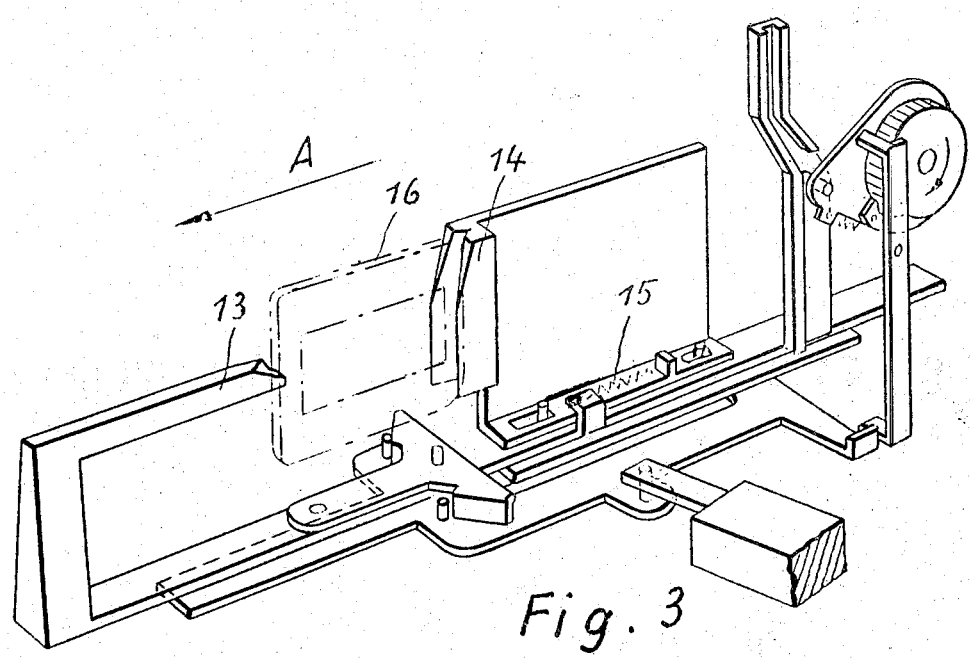
FIG. 3 is a perspective view illustrating details of the gripper mechanism or carrier mechanism for shifting a picture slide from the magazine to the projection window or gate, or vice versa.

The mechanism for shifting the slides laterally (radially with respect to the magazine and transversely with respect to the optical axis) from the magazine to the projection window or gate in the optical axis, or back from the projection window into the magazine, is illustrated in FIG. 3. Certain conventional parts known in the art are partially illustrated in this view, but not specifically identified by reference numerals and will not be described. The slide shifting mechanism comprises essentially a U-shaped gripper 13 which engages the inner vertical edge of the slide (that is, the edge closest to the center of the ring magazine and farthest from the optical axis) working in cooperation with a companion gripper jaw 14 which engages the outer vertical edge of the slide (that is, the edge farthest from the center of the magazine and closest to the optical axis). The gripper 13 is of approximately U-shape with the U laid on its side, having a long horizontal leg which extends from the operating mechanism within the portion 5 of the projector housing, laterally beneath the bottom of the magazine to a point near the center of the magazine, then a vertical leg extending upwardly through the central aperture of the magazine, and then another horizontal leg extending from the top of the vertical leg horizontally toward the optical axis, at an elevation just above the top of the magazine. Since the particular slide to be shifted from the magazine to the optical axis has already been raised by the ramp 3, the upper horizontal leg or arm of the member 13 is at an elevation to engage the vertical edge of the picture slide approximately midway of its height, as seen in FIGS. 2 and 3, where the picture slide which is about to be shifted is shown in broken lines at 16.

The previously mentioned other jaw 14 of the slide shifting mechanism, which enages the vertical outer edge of the slide, is mounted on the long lower horizontal arm of the member 13, slidable longitudinally thereon to a limited extent, and urged by a spring 15 in a direction toward the upper arm of the member 13. As seen in FIG. 3, the gripping member 14 has a vertical groove which is V-shaped in horizontal section, sufficiently elongated vertically to engage most of the height of the outer vertical edge of the particular picture slide which is to be shifted between the magazine and the optical axis. The upper arm of the other gripper 13, on the other hand, has a V-shaped notch which engages the inner vertical edge (edge closest to the center of the magazine) of the slide at a point roughly midway from top to bottom, and keeps the opposite vertical edge seated in the groove of the opposite member 14, under the tension of the spring 15. Thus the slide to be transported or shifted is clamped between these two parts 13 and 14.

Assuming that a slide is in projection position at the optical axis and that the slide is to be changed so that another slide can be projected, the slide gripping or shifting mechanism moves in the direction of the arrow A in FIG. 3. Immediately before the advancing edge of the slide (the left edge when viewed as in FIG. 3) hits the inner wall of the magazine and can not be moved any further, the jaw 14 is prevented from moving further by a stop so that it stops outside the area of the slide. The companion gripper jaw or point 13, however, moves further leftwardly a slight distance, until it also is outside the area of the slide. This disengaging stroke may also be used, as known in the art, for stepping or feeding the magazine through one step. The slide which has just been released is carried around with the turning of the magazine, and moves out of the projection plane. If it is not already seated against the inner edge wall of the magazine, the horizontally beveled cam portion 8 or 9, as the case may be (depending upon the direction of rotation of the magazine) will engage the outer vertical edge of the slide and shove the slide radially inwardly toward the center of the magazine.

When the next slide reaches the projection plane as a result of rotation of the magazine through one increment, the gripper point 13 then moves to the right when viewed as in FIG. 3, toward the jaw 14 which has been held by its stop above mentioned. In so doing, the gripper point 13 engages the adjacent vertical edge of the slide 16, and moves the slide rightwardly, through the guiding cam parts or beveled parts 8 and 9 of the jaws 6 and 7, and into the groove of the gripping jaw 14, and the motion continues in a rightward direction, with the picture slide grasped between the jaws 13 and 14, until the picture slide is properly centered in projection position at the optical axis. The picture slide remains gripped between the jaws 13 and 14 while projection takes place.

It has been mentioned above that there is a stop which stops the leftward motion of the jaw 14 when the projected slide is brought back to the magazine. Preferably this stop is provided by the jaws 6 and 7 which are in a position to be engaged by and form abutments preventing further leftward movement of a portion of the member 14. In this manner, it is possible that if the magazine is drawn out axially to remove it from the projector, the engagement of the magazine with the beveled portion 11 of the jaws 6 and 7 will not only swing these jaws radially outwardly to allow the magazine to pass, but also the outward motion of the guiding jaws 6 and 7 will cause a slight outward movement of the gripping jaw 14 against the tension of its spring 15, insuring that this jaw is moved back far enough so that it cannot interfere with the axial upward movement of the magazine which is being taken out of the projector. The other gripping jaw 13 also does not impede the removal or insertion of the magazine, because the jaw 13 has come to rest in a position entirely within the outline of the central opening of the magazine, and does not overlap or overlie any part of the magazine.

The gripper part or shifting part 13 can also be equipped with a handle 18, if desired, so that the shifting mechanism can be grasped and actuated by hand.

The central space of the ring magazine is preferably occupied by a stationary hub member 17 which is part of the projector housing, this hub member 17 having a diametrical slot for passage of the upstanding or vertical arm of the gripper or shifter member 13. The guiding of the ring magazine in its rotary motion can be provided entirely by a circular track on which the bottom of the magazine rests, or partly by such a track and partly by the hub which rises through the center of the magazine.

Other parts of the projector, such as the driving mechanism, may be of any form known in the art, the details of which are not important for purposes of the present invention. Some of the features may, for example, be of the form disclosed in German patent application (Offenlegungsschrift) no. 1,802,546.

What is claimed is:

1. A picture slide projector for use with horizontally arranged ring magazines, including means for mounting a ring magazine in position to be removed from the projector by a substantially vertical upward axial movement and to be replaced in the projector by a substantially vertical downward axial movement, said mounting means mounting said magazine for rotation about a substantially vertical axis to bring successive slides in said magazine to a position aligned with a projection window so that an aligned slide may be shifted laterally from such aligned position to such projection window, characterized by the provision of a slide guide member in the immediate vicinity of the slide which is to be shifted from the magazine to a projection position, said slide guide member being mounted for radial movement toward and away from the ring magazine and being resiliently urged toward the magazine to a normal operating position in which it overlies a portion of the magazine.

2. A projector as defined in claim 1, in which said slide guide member is pivotally mounted to swing toward and away from the magazine.

3. A projector as defined in claim 1, further including cam means for moving said slide guide member radially away from the magazine as said magazine is moved axially upwardly or downwardly to remove it from or place it on the projector.

4. A projector as defined in claim 3, in which said cam means comprises bevel portions (11, 12) at top and bottom of the slide guide member.

* * * * *

UNITED STATES PATENT OFFICE
CERTIFICATE OF CORRECTION

Patent No. 3,790,269　　　　　　　Dated February 5, 1974

Inventor(s) REINHARD SOBOTTA

It is certified that error appears in the above-identified patent and that said Letters Patent are hereby corrected as shown below:

On the cover sheet [73], the assignee should read as follows:　-- Rollei-Werke Franke & Heidecke, Brannschweig, Germany -- .

On the cover sheet, insert -- [30] Claims Foreign Priority Data　Germany　P 20 45 661.5　Sept. 16, 1970 -- .

Signed and sealed this 13th day of August 1974.

(SEAL)
Attest:

McCOY M. GIBSON, JR.　　　　　　　C. MARSHALL DANN
Attesting Officer　　　　　　　　　Commissioner of Patents